«12» United States Patent
Shin et al.

(10) Patent No.: US 7,372,898 B2
(45) Date of Patent: May 13, 2008

(54) PATH LOSS MEASUREMENTS IN WIRELESS COMMUNICATIONS

(75) Inventors: Sung-Hyuk Shin, Northvale, NJ (US); Marian Rudolf, Montreal (CA); Stephen G. Dick, Nesconset, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 758 days.

(21) Appl. No.: 10/731,457

(22) Filed: Dec. 9, 2003

(65) Prior Publication Data
US 2004/0170132 A1     Sep. 2, 2004

Related U.S. Application Data

(60) Provisional application No. 60/432,703, filed on Dec. 11, 2002.

(51) Int. Cl.
H04B 1/38      (2006.01)
H04L 5/16      (2006.01)

(52) U.S. Cl. ..................... 375/219; 370/280
(58) Field of Classification Search .......... 375/219; 370/280
See application file for complete search history.

(56) References Cited

U.S. PATENT DOCUMENTS

| 6,101,179 | A | 8/2000 | Soliman | |
| 6,411,662 | B1 * | 6/2002 | Sakoda et al. | 375/340 |
| 7,151,740 | B2 * | 12/2006 | Zhang et al. | 370/208 |
| 2002/0085504 | A1 | 7/2002 | Zeira et al. | |
| 2002/0168994 | A1 | 11/2002 | Terry et al. | |
| 2003/0108274 | A1 | 6/2003 | Budka et al. | |
| 2003/0109274 | A1 | 6/2003 | Budka et al. | |
| 2004/0022230 | A1 | 2/2004 | Zeira et al. | |
| 2005/0003846 | A1 * | 1/2005 | Anderson | 455/522 |

FOREIGN PATENT DOCUMENTS

RU    2231927    6/2004

* cited by examiner

Primary Examiner—Curtis B. Odom
(74) Attorney, Agent, or Firm—Volpe and Koenig, P.C.

(57) ABSTRACT

A method for determining uplink power requirements for a transceiver in a wireless communication system includes obtaining measurements from a beacon signal occupying a first timeslot in a frame; obtaining measurements from at least one additional channel having a known transmitted signal strength and occupying a second timeslot in the frame; and utilizing the measurements to determine a path loss estimate.

8 Claims, 3 Drawing Sheets

PATH LOSS MEASUREMENTS IN WIRELESS COMMUNICATIONS

CROSS REFERENCE TO RELATED APPLICATION(S)

This application claims priority from U.S. provisional application No. 60/432,703 filed on Dec. 11, 2002, which is incorporated by reference as if fully set forth herein.

FIELD OF INVENTION

The present invention generally relates to path loss measurements in wireless communications. More particularly, the invention pertains to a method and apparatus for obtaining path loss measurements using several channels to perform open loop power control.

BACKGROUND

In determining uplink (UL) power requirements for a transceiver, it is possible to examine received downlink (DL) signals and extract at least some of the information required to determine the proper UL transmission power since there is typically a proportionality between the received signal power and the power necessary to transmit. If the transmission power of a signal received at the transceiver is known, or if there is some way to estimate the transmission power, the necessary transmission power to reply to that transmission can be estimated.

However, for certain types of communication systems, such as time slotted communication systems, these estimates may be very inaccurate. This is because the accuracy of signal level measurements is affected by the duration of the measurement and the elapsed time since the measurement was last taken. If the duration of the measurement is too short, variations in the measured signal level adversely affect the measurement. If the elapsed time is too long, the measurement becomes less representative of the present state of the signal level due to interim changes in the signal.

For example, in the case of a wireless transmit/receive unit (WTRU) on a time division duplex (TDD) or time division synchronous code division multiple access (TD-SCDMA) system, the power of the transmission may vary greatly both between timeslots, or even within a timeslot. This power variation is affected by various factors, most notably the physical movement of the WTRU. For example, if a WTRU is moving at a moderate pace, such as 60 km/h, it is possible to lose significant signal power in several tens of milliseconds. If a radio frame is 10 ms long, this means that significant signal variations can occur even within the frame. Therefore, it is of prime importance that path loss measurements be applied as fast as practical since an instantaneous measurement of signal characteristics can quickly lose its validity. It is very difficult to find a reference with which to base power adjustments and control.

In the DL of many current wireless communication systems, there is at least one beacon signal or pilot signal that is transmitted to all of the WTRUs. If the wireless communication system is a time-slotted system, there is at least one beacon signal in each frame. This is the case with a Universal Mobile Telecommunication System (UMTS), which uses the beacon signal for path loss measurements.

For example, in TDD and TD-SCDMA systems, the WTRU measures the received signal code power (RSCP) of the serving cell's primary common control physical channel (P-CCPCH) or other beacon channel each frame or subframe, and calculates the path loss between the Node B and the WTRU. This has the advantage of providing an accurate path loss measurement immediately after the beacon signal is transmitted. The path loss measurement based on the RSCP is used to determine the transmit power for UL physical channels. Examples of such UL physical channels include the physical random access channel (PRACH), the dedicated physical channel (DPCH), the physical uplink shared channel (PUSCH), and the high speed shared information channel (HS-SICH).

In TDD systems, open-loop power control for UL transmissions based upon DL path loss estimations is commonly employed. TD-SCDMA systems usually employ an open-loop power control for setting of UL initial transmission power before transitioning into closed-loop power control mode, or for reverting back into open-loop power control mode.

It would therefore be desirable to provide a method for performing path loss estimation without the disadvantages of known prior art channel estimation methods.

SUMMARY

According to the present invention, a determination of power requirements on a channel, for example on an UL channel, is made in an environment in which DL signals have a time separation from UL signals. Measurement of a beacon channel and at least one additional channel are taken and the path loss for each channel is then calculated. The calculated path loss is then applied to a subsequent UL timeslot. In one particular embodiment of the invention, further path loss calculations are performed in subsequent DL timeslots. These further path loss calculations and the previous path loss calculations are combined and applied to subsequent UL timeslots.

BRIEF DESCRIPTION OF THE DRAWING(S)

A more detailed understanding of the invention may be had from the following description of a preferred embodiment, given by way of example and to be understood in conjunction with the accompanying drawing wherein.

DETAILED DESCRIPTION OF THE PREFERRED EMBODIMENT(S)

Figure 1:
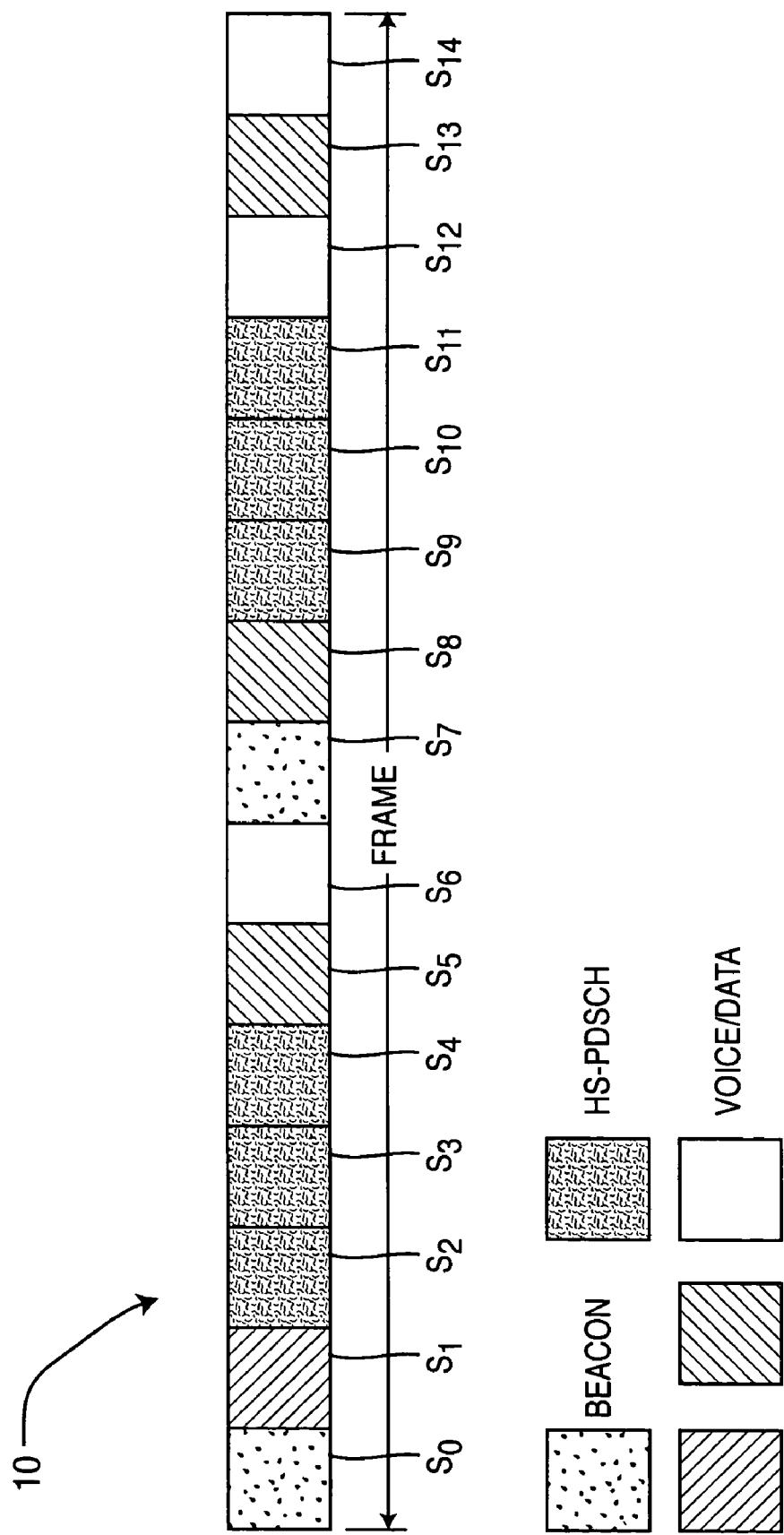
FIG. 1 is a communication frame having a plurality of time slots.

The present invention will be described with reference to the drawing figures wherein like numerals represent like elements throughout.

The present invention will be described hereinafter as being applicable generally to time-slotted systems, and being applicable specifically to TDD and TD-SCDMA systems. However, it should be understood by those of skill in the art that the present invention is not limited specifically to these systems.

The present invention provides an improved channel estimation method using several DL channels, wherein path loss (PL) measurements are made on these several DL channels such that time duration is minimized between: a)

the reception and measurement of the DL reference signal at the WTRU and computation of a UL power setting; and b) the UL timeslot where the computed power setting is applied. The path loss measurements are determined by measuring the power of a received DL signal, obtaining the transmission power of the received signal and calculating the difference between the transmitted power and the received power.

Every radio frame, a path loss ($PL_i$) (i corresponding to the numbering of frames) is calculated. The path loss that is used for setting the WTRU transmission power in the UL timeslot is a function of the DL-UL timeslot separation. The path loss value can either correspond to the last $PL_i$ obtained if the separation between the DL and UL timeslots is very small; or to a weighted average of several past $PL_i$s (i.e., based on the most recent path loss obtained in the current frame plus several path losses computed for previous frames), if the duration of the DL and UL timeslot separation is large. Using such a weighted average when the duration of the DL and UL timeslot separation is large is advantageous since a short term estimate may be outdated.

According to the present invention, the measurement of received signal code power (RSCP) of at least one other transmitted channel (which is distinct from the beacon channel) is used in addition to the RSCP of a beacon channel, such as the Primary Common Control Physical Channel (P-CCPCH) or the High Speed Physical Downlink Shared Channel (HS-PDSCH).

In alternative embodiments of the present invention, in addition to using a beacon channel and one other physical channel for calculation of path loss, measurements may be made on three or more physical channels, or as many physical channels as possible. Using a plurality of DL channels for measurements increases the available power control gain, resulting in both increased cell coverage and capacity.

The transmission power of the received signal in accordance with the present invention may be obtained in two ways: 1) it is either a fixed value that is known to the WTRU; or 2) it is provided as a value by the transmitter to the receiver. If the measured signal is at a fixed value known to the WTRU, the RSCP of the signal is measured and the path loss for the measured signal is calculated based on that known transmission power value. If the measured signal is not at a known fixed value, either an offset value to a known signal or an actual value is provided by the transmitter to indicate the transmission power.

FIG. 1 shows the arrangement within a radio frame of multiple channels as represented by multiple timeslots $S_0$-$S_{14}$. This is an example of a typical TDD frame structure comprising several DL channels including beacon channels, HS-PDSCHs and data/voice channels. It should be noted that the illustrated number of timeslots is given by way of example only and the precise number of timeslots will vary according to the transmission standard. For example, in wireless communications including communications under the 3GPP protocol, each TDD frame comprises fifteen (15) timeslots as shown. Of course, for a TD-SCDMA system, the frame structure would look differently.

Path loss calculations can be performed on certain DL channels. The radio frame 10 includes two beacon timeslots $S_0$ and $S_7$; seven implementation specific (i.e., data or voice) timeslots $S_1$, $S_5$, $S_6$, $S_8$, $S_{12}$, $S_{13}$, $S_{14}$; and six HS-PDSCH timeslots $S_2$, $S_3$, $S_4$, $S_9$, $S_{10}$, $S_{11}$.

Figure 2:
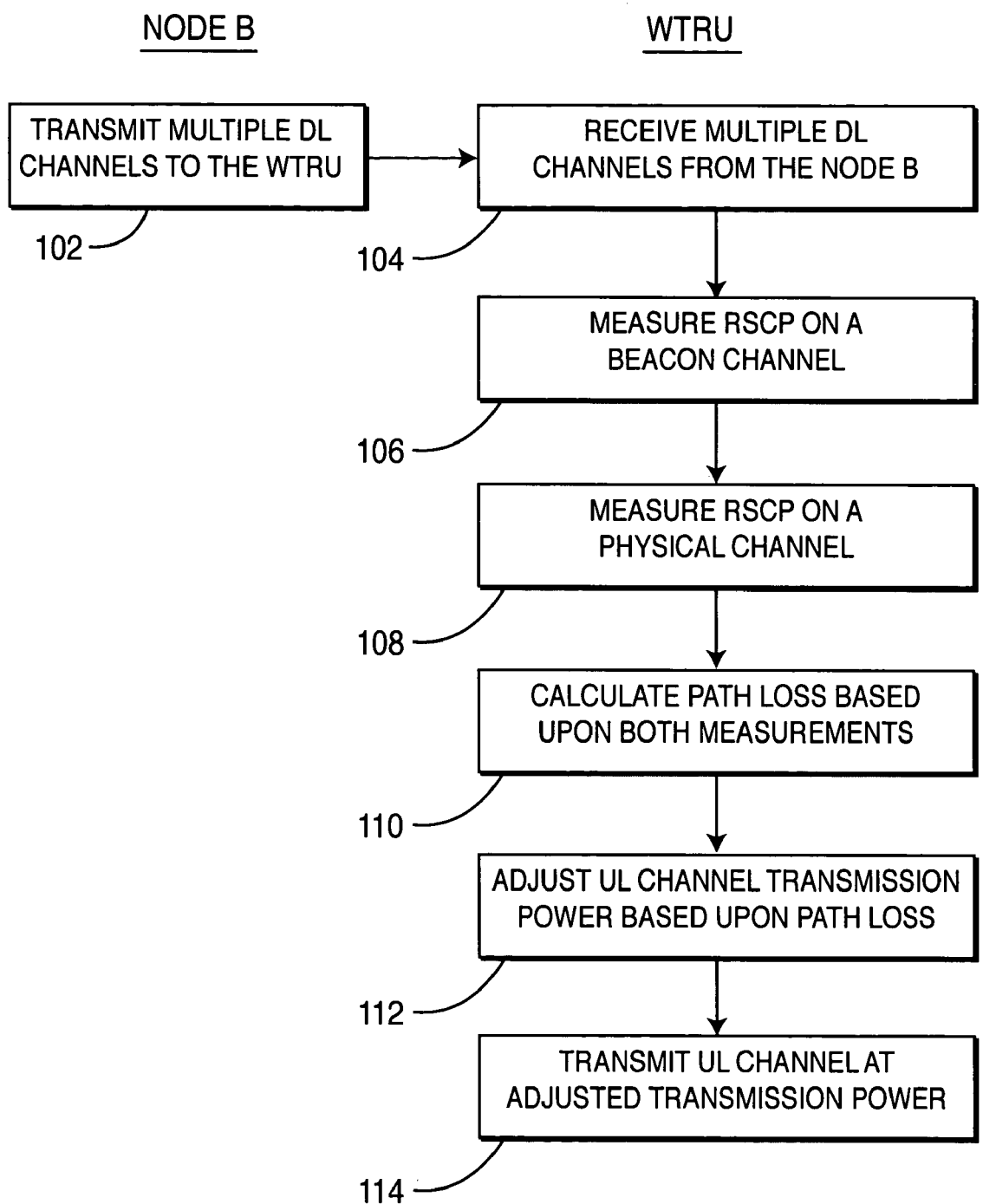
FIG. 2 is flow diagram of a method for performing path loss measurements and transmission power settings in accordance with the present invention.

Referring to FIG. 2, a flow diagram of the procedure 100 for performing path loss measurements in accordance with the present invention is shown. The Node B transmits multiple DL channels to the WTRU (step 102). The WTRU receives the multiple DL channels from the Node B (step 104). The WTRU measures the RSCP on a beacon channel (step 106) and measures the RSCP on a physical channel (step 108) whose transmission power is known at the receiver, or the receiver is informed of the transmission power by the transmitter. It should be noted that steps 106 and 108 need not necessarily be performed as shown in FIG. 2; step 108 may be performed before step 106 without adverse consequences.

The WTRU calculates the path loss based upon both measurements (step 110), or alternatively the most recent measurement, as will be explained in detail hereinafter. The WTRU then adjusts the UL channel transmission power based upon the combined calculated path loss (step 112) and transmits the UL channel at the adjusted transmission power (step 114).

In accordance with the present invention, the beacon channel may be any of a plurality of beacon signals including, but not limited to, any type of broadcast channel (BCH), the Primary Common Control Physical Channel (P-CCPCH), the Forward Access Channel (FACH), the Paging Channel (PCH), or the Paging Indicator Channel (PICH). Additionally, the physical channel may include, but is not limited to, the High Speed Physical Downlink Shared Channel (HS-PDSCH), the secondary Common Control Physical Channel (S-CCPCH), the High Speed Physical Downlink Shared Channel (HS-PDSCH), or the High Speed Shared Control Channel (HS-SCCH).

With respect to calculating the path loss at step 110, there are several different alternatives. The first and most simple alternative is calculating the path loss of the most recently occurring DL channel as a basis for determining the UL transmission power. For example, if the beacon channel is in TS0 and TS7, the HS-DSCH is in TS4, and the UL channel (i.e., HS-SICH) is in TS6, this first alternative selects the path loss calculation from the timeslot closest to the UL timeslot; i.e., the HS-PDSCH in TS4. If, in a subsequent frame, the UL channel is in TS8, then the path loss calculation is based on the beacon channel in TS7, since it is the most recent timeslot.

A second alternative is to calculate the path loss as a function of the measurements on all the DL channels of the same frame. In the preferred solution the function is a weighted average. However, the function could be a simple average, or some other function.

A third alternative is similar to alternative 2, except that the path loss is calculated as a function of the measurements on some or all of the DL channels of the present frame, plus some of the DL channels of previous frames. As those who are skilled in the art would appreciate, a weighted-function may be implemented such that older estimates are weighted less than newer estimates.

Finally, a fourth alternative to calculate the path loss uses the following equation:

$$UL\ Tx\ Pwr = \text{interference value} + \text{controllable offset} + SIR + PL;\qquad \text{Equation (1)}$$

where SIR is the signal-to-interference ration and the path loss (PL) is given by: PL=(transmission power of beacon channel)−(the RSCP of the beacon channel), or for the HS-PDSCH, PL=(transmission power of beacon channel)−(power offset)−(total RSCP of the HS-PDSCH), where the power offset=(transmission power of beacon channel)−(total transmission power of the HS-PDSCH).

For example, if the beacon channel is transmitted at a fixed power (Txpwr1) at 20 dBm, and the HS-PDSCH is always at 10 dB less, the transmit power of the HS-PDSCH (Txpwr2) is 10 dBm. If the PL observed in a particular frame is 90 dB, then the WTRU will measure RSCP1=(20−90)=−70 dBm on the timeslot of the beacon channel but RSCP2=(10−90)=−80 dBm on the timeslot of the HS-PDSCH. If the WTRU in informed by the transmitter of the difference (i.e., the delta) in transmission power between the two transmitted channels (the delta=Txpwr1−Txpwr2), or alternatively the values of Txpwr1 and Txpwr2, the WTRU can determine path loss in an unambiguous manner.

In an alternative embodiment of the present invention, in addition to using a beacon channel and one other channel, the RSCP measurements for the calculation of path loss are made on as many channels as possible. It should be noted that although the beacon channel is referred to throughout, the invention can utilize channels other than a beacon channel, such as one or more physical channels. A beacon channel is not required.

Figure 3:
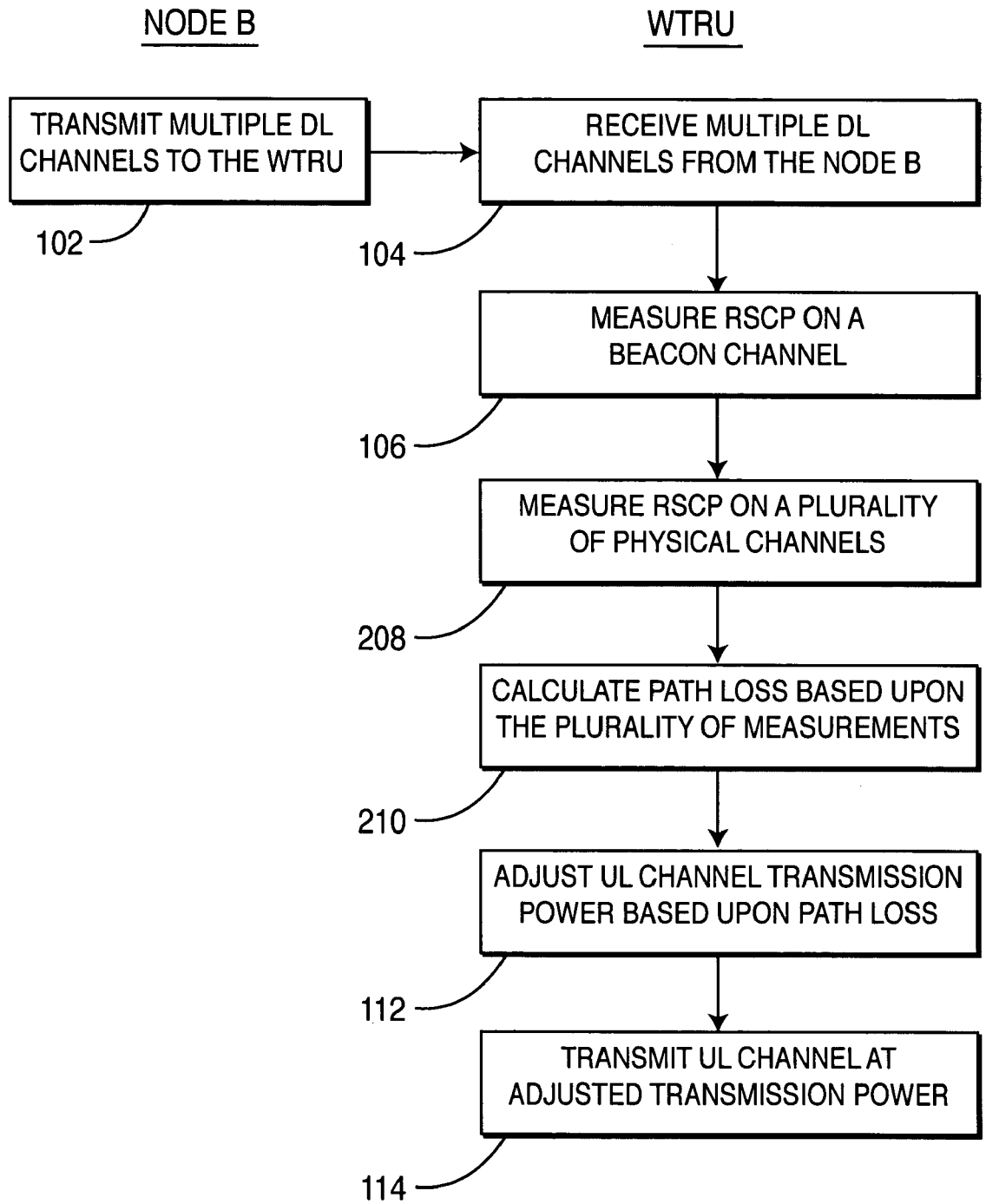
FIG. 3 is a flow diagram of a method for performing path loss measurements and transmission power settings in accordance with an alternate embodiment of the invention.

An alternate embodiment of the present invention is shown in FIG. 3. This procedure 200 is similar to the procedure 100 shown in FIG. 2 and those steps which are the same have the same reference numerals. In this embodiment, steps 208 and 210 are employed to measure the RSCP on a plurality of channels (step 208) and calculate path loss based upon the plurality of measurements (step 210).

For instance, additional path loss measurements may be obtained from the RSCP of several HS-PDSCHs whose total transmit powers are constant. If the results of the HS-PDSCH measurements are correlated with beacon channel measurement, differences in the measurements are accounted for by the operation of this invention.

Benefits from the invention come from two premises: 1) applying the most recent path loss estimate is beneficial, since it is closer in time to the real value and therefore, there is less time for variation of the actual path loss since the last measurement was made; and 2) higher measurement duration per path loss measurement is better for the quality of the path loss estimate. Having more than just a single timeslot available per frame for the path loss estimation permits a closer estimation to the actual path loss value for the other direction link, the UL in the present example.

Certain modifications are possible within the ambit of the present invention. For example, PL measurement in the invention may be accomplished by first introducing the signaling of the power offset between the beacon signal and HS-PDSCH, and then measuring the total RSCP of the HS-PDSCHs. For example, for the power control setting in Equation 1, several parameters such as SIR are used to control and adjust the WTRU behavior. These parameters can be individually signaled to the WTRU, such as by RRC signaling, or they can be put on the BCH for all WTRUs in the system. All of the above modifications, as well as other similar modifications and variations, are envisaged to be within the scope of the present invention.

What is claimed is:

1. A method for determining uplink power requirements in a transceiver where there is timeslot separation between uplink and downlink timeslots, the method comprising:
   receiving a beacon channel;
   receiving a power offset value representing a difference in transmission power between the beacon channel and a physical channel;
   obtaining received signal code power (RSCP) measurements of each of the beacon channel and the physical channel; and
   determining a path loss based on the RSCP measurements and the power offset value.

2. The method of claim 1 further comprising:
   employing the path loss for use in an uplink timeslot.

3. The method of claim 1 wherein the determining the path loss is by subtracting the RSCP of the beacon channel from a transmission power of the beacon channel.

4. The method of claim 1 wherein a transmission power of the physical channel is constant.

5. A wireless transmit/receive unit (WTRU) for determining uplink power requirements where there is timeslot separation between uplink and downlink timeslots, comprising:
   a receiver circuit for receiving a beacon channel, an additional channel and a power offset value representing a difference in transmission power between the beacon channel and the additional channel;
   a measurement circuit for obtaining received signal code power (RSCP) measurements of each of the beacon channel and the additional channel; and
   a path loss circuit for determining a path loss responsive to the RSCP measurements and the power offset value.

6. The WTRU of claim 5 further comprising a transmitter circuit for transmitting in an uplink timeslot using the determined path loss.

7. The WTRU of claim 5 wherein the path loss circuit determines the path loss by subtracting the RSCP of the beacon channel from a transmission power of the beacon channel.

8. The WTRU of claim 5 wherein a transmit power of the additional channel is constant.

* * * * *

UNITED STATES PATENT AND TRADEMARK OFFICE
CERTIFICATE OF CORRECTION

| | |
|---|---|
| PATENT NO. | : 7,372,898 B2 |
| APPLICATION NO. | : 10/731457 |
| DATED | : May 13, 2008 |
| INVENTOR(S) | : Shin et al. |

It is certified that error appears in the above-identified patent and that said Letters Patent is hereby corrected as shown below:

ON THE TITLE PAGE

Item (56), U.S. PATENT DOCUMENTS, page 1, right column, line 5, delete "2003/0108274 A1 6/2003 Budka et al.".

At column 3, line 59, after the word "look", delete "differently", and insert therefor --different--.

At column 4, line 59, before the words "and the", delete "ration", and insert therefor --ratio--.

At column 5, line 6, before the word "informed", delete "in", and insert therefor --is--.

Signed and Sealed this

Twenty-sixth Day of August, 2008

JON W. DUDAS
*Director of the United States Patent and Trademark Office*